(12) United States Patent
Mori et al.

(10) Patent No.: US 8,900,653 B2
(45) Date of Patent: Dec. 2, 2014

(54) METHOD OF PRODUCING ELECTRODE FOR ELECTRICITY STORAGE DEVICE

(75) Inventors: Junya Mori, Toyota (JP); Hideki Hagiwara, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 47 days.

(21) Appl. No.: 13/615,736

(22) Filed: Sep. 14, 2012

(65) Prior Publication Data

US 2013/0078365 A1 Mar. 28, 2013

(30) Foreign Application Priority Data

Sep. 27, 2011 (JP) ................. 2011-211074

(51) Int. Cl.
*B05D 5/12* (2006.01)
*B05D 3/04* (2006.01)
*B05D 1/26* (2006.01)
*H01M 4/139* (2010.01)
*C23C 18/12* (2006.01)
*H01M 4/04* (2006.01)
*H01M 4/62* (2006.01)
*H01M 10/0525* (2010.01)

(52) U.S. Cl.
CPC ............ *H01M 4/139* (2013.01); *C23C 18/1262* (2013.01); *B05D 5/12* (2013.01); *H01M 4/0404* (2013.01); *H01M 4/0416* (2013.01); *H01M 4/621* (2013.01); *H01M 10/0525* (2013.01); *Y02E 60/122* (2013.01)
USPC ............. 427/58; 427/79; 427/80; 427/81; 427/115; 427/383; 427/377

(58) Field of Classification Search
CPC .......... H01M 4/04; B05D 1/26; B05D 3/046; B05D 5/12; C23C 18/1262
USPC .................... 427/79–81, 115, 383.1, 377
See application file for complete search history.

(56) References Cited

U.S. PATENT DOCUMENTS

| | | | |
|---|---|---|---|
| 6,284,405 B2 * | 9/2001 | Kaido et al. | 429/94 |
| 8,043,747 B2 * | 10/2011 | Suzuki et al. | 429/217 |
| 2002/0168569 A1 * | 11/2002 | Barriere et al. | 429/217 |
| 2008/0314482 A1 | 12/2008 | Suzuki et al. | |
| 2011/0111292 A1 * | 5/2011 | Kwon et al. | 429/209 |
| 2011/0274948 A1 * | 11/2011 | Duduta et al. | 429/50 |

FOREIGN PATENT DOCUMENTS

| | | |
|---|---|---|
| CN | 1496432 | 5/2004 |
| DE | 3538732 | * 6/1986 |
| JP | 2003-331829 | * 11/2003 |
| JP | 2009-48958 | 3/2009 |
| JP | 2009-205974 | 9/2009 |
| JP | 2010-98020 | 4/2010 |
| WO | WO 01/92158 A1 | 12/2001 |

* cited by examiner

*Primary Examiner* — Brian K Talbot
(74) *Attorney, Agent, or Firm* — Finnegan, Henderson, Farabow, Garrett & Dunner, LLP

(57) ABSTRACT

A method of producing an electrode for an electricity storage device includes producing a paste to form an electrode active material layer, in which aggregates of a solids fraction material that contains at least an electrode active material and a binder are dispersed in a solvent, coating the paste on a surface of a current collector, and drying the current collector coated with the paste, to form the electrode active material layer formed of the solids fraction material. The paste is produced in such a manner that a content ratio of the solids fraction material in the paste is 60 to 80 mass %, an abundance ratio for the aggregates with a particle size that is equal to or smaller than 20 μm is at least 99%, and a viscosity at 25° C. and a shear rate of 40 $s^{-1}$ is 200 to 5,000 mPa·s.

10 Claims, 3 Drawing Sheets

US 8,900,653 B2

METHOD OF PRODUCING ELECTRODE FOR ELECTRICITY STORAGE DEVICE

INCORPORATION BY REFERENCE

The disclosure of Japanese Patent Application No. 2011-211074 filed on Sep. 27, 2011 including the specification, drawings and abstract is incorporated herein by reference in its entirety.

BACKGROUND OF THE INVENTION

1. Field of the Invention

The invention relates to a method of producing an electrode for an electricity storage device.

2. Description of Related Art

Electricity storage devices, as typified by lithium ion secondary batteries, electric double-layer capacitors, and their combinations (the lithium ion capacitor is a typical example) have become increasingly important in recent years. In particular, the lithium ion secondary battery, which provides a high energy density at a low weight, is preferentially used as a high-output power source for installation in vehicles. In a typical lithium secondary battery structure, electrodes are provided in which an electroconductive member (current collector) carries an electrode active material layer that contains an electrode active material capable of reversibly incorporating and discharging the lithium ion, which functions as the charge carrier. In a typical structure for an electric double-layer capacitor, electrodes (polarizable electrodes) are provided in which an electrode layer including a polarization material (also called "active material") on an electroconductive member (current collector), such as active carbon. The polarization material is capable of forming ion and charge layers (the electric double layer) by adsorbing cations or anions. These electrodes are typically produced by: first dispersing a solids fraction material, i.e., the electrode active material (here and below this includes the polarization material referenced above), a conductive material that exhibits a high electroconductivity, a binder, and so forth, in a suitable solvent to produce a paste-form composition (this composition is referred to simply as a "paste" in the following) to form the electrode active material layer; coating this paste in layers on the surface of a current collector; and then drying this applied paste to remove the solvent and form an electrode active material layer including the electrode active material on the current collector. The paste-form includes slurry-form and ink-form.

There have been numerous attempts with regard to the production of these electricity storage device electrodes to improve the properties of the obtained electrodes and electricity storage devices by controlling the state of the electrode active material present in the paste to form the electrode active material layer. For example, WO 2001/092158 discloses that—by using a specific chemical composition for a lithium-transition metal complex oxide that is the positive electrode active material for a lithium ion secondary battery, and by bringing the curve gradient in the cumulative volume-particle size distribution curve at a 20% cumulative volume percentage and the curve gradient at an 80% cumulative volume percentage into prescribed ranges—the compressive flow of the particles during pressing can be facilitated when electrode production is carried out using particles of this lithium-transition metal complex oxide. Thus, a high-capacity electrode can be produced.

However, the improvements in the state of the electrode material, e.g., the active material particles, as referenced above have been carried out with the objective of improving electrode performance. That is, there have been no efforts at actively modifying and/or controlling the state of the electrode material with the objective of improving the production method rather than the electrode (the production target).

SUMMARY OF THE INVENTION

The invention provides a production method for an electrode for an electricity storage device that, by controlling the state of the dispersion of the paste to form the electrode active material layer, can reduce the time and energy required for drying the paste. The invention also provides a method of producing an electricity storage device that includes this method of producing an electrode for an electricity storage device.

The inventors for this application carried out extensive and intensive investigations in order to realize high-rate drying that would optimize the time and amount of heat consumed by drying in the process of producing an electrode for an electricity storage device. As a result, it was discovered that the high-rate drying of the coating film provided by coating the paste to form the electrode active material layer on the current collector is much more effectively carried out by controlling the state of the paste to form the electrode active material layer—this paste being the material that has been coated—into an optimal state rather than by exercising fine control of the high-rate drying conditions (and facilities). The invention was achieved based on this finding.

A first aspect of the invention relates to a production method for an electrode for an electricity storage device. This production method includes producing a paste to form an electrode active material layer. The paste includes aggregates of solids fraction material that contains at least an electrode active material and a binder, and the aggregates are dispersed in a solvent. The production method includes coating the paste on a surface of a current collector; and drying the current collector coated with the paste, to form the electrode active material layer formed of the solids fraction material.

Paste production may be carried out with the following (A) to (C) as essential conditions in the aforementioned paste production step in the method of producing an electricity storage device electrode:

(A) a content ratio of the solids fraction material in the paste is 60 to 80 mass %, (B) an abundance ratio for the aggregates with a particle size that is equal to or smaller than 20 μm is at least 99%, and (C) a viscosity at 25° C. and a shear rate of 40 s$^{-1}$ (or less) is 200 to 5,000 mPa·s.

In this Specification, the "abundance ratio (abundance frequency)" refers to the ratio of the number of aggregates in a particular particle size range to the total number of aggregates in the paste. For example, the term "abundance ratio for aggregates with a particle size that is equal to or smaller than 20 μm is at least 99%" means Y/X×100≥99 letting X be the total number of aggregates in the paste and letting Y be the number of aggregates with a particle size that is equal to or smaller than 20 μm in the paste.

This constitution, by controlling the state of the paste to form the electrode active material layer in accordance with (A) to (C), makes possible the high-rate drying of the paste and makes it possible to produce an electricity storage device electrode while reducing the energy and amount of heat required for drying and substantially shortening the required time. Accordingly, a highly efficient method of producing an electrode for an electricity storage device is provided, without requiring special facilities or equipment. In addition, a reduction in costs can be obtained by lowering the time, energy, and amount of heat required in the drying step.

Moreover, in the paste production step, the particle size that provides an abundance ratio of at least 99% (that is, substantially all) in the aggregate may be made is equal to or smaller than twice an average particle size of the electrode active material by a laser diffraction scattering method. This feature makes possible an even more favorable control of the state of the paste to form the electrode active material layer—even when a material having a microfine particle size is used as the electrode active material.

The drying may be carried out at a temperature of 70 to 150° C. for a time of 50 to 150 seconds at a wind velocity of 1 to 15 m/s. This feature makes it possible to carry out high-rate drying of the paste without producing, for example, creases, ripples, cracks, fissures; and so forth, in the electrode active material layer that is formed. An even more efficient method of producing an electricity storage device electrode is provided as a result.

For example, the drying time can be brought to is equal to or shorter than 120 seconds when the coating weight (weight per unit area) of the paste on the current collector is 25 to 50 mg/cm$^2$. When one considers that the time that has been required in conventional drying is about 450 seconds, this is about one-third to one-fourth and thus a substantial shortening of the drying time can be obtained.

An electroconductive material may be also added as the solids fraction material. This solids fraction material can be blended so as to provide a mass ratio for the electrode active material, electroconductive material, and binder of electrode active material:electroconductive material:binder of 97 to 80:2 to 15:1 to 5. According to this feature, in those instances, for example, in which a material having a low electroconductivity has been used as the electrode active material, an electroconductive material can also be incorporated as a solids fraction material in the paste to form an electrode active material layer. The content ratio of the electroconductive material is not significantly restricted.

Thus, for example, a positive electrode for a lithium ion secondary battery can be produced by using, as the electrode active material described above, a positive electrode active material, e.g., a lithium-transition metal oxide, that can constitute the positive electrode of a lithium ion secondary battery. Or, a negative electrode for a lithium ion secondary battery can be produced by using, as the electrode active material described above, a negative electrode active material, e.g., a material that is a compound of a metal as typified by silicon, that can constitute a negative electrode for a lithium ion secondary battery. In addition, a negative electrode for an electric double layer capacitor can be produced by using, as the electrode material described above, a polarization material (active material), typically active carbon, that can constitute an electrode for an electric double layer capacitor. This constitution makes possible the highly efficient and low-energy production of various types of electricity storage device electrodes having a desired performance.

The above method of producing an electrode for an electricity storage device can be used for the production of the electrodes (positive electrode and negative electrode) for a variety of electricity storage devices. Specifically, for example, electricity storage device electrodes that exhibit an excellent performance, e.g., high capacity characteristics, excellent charge-discharge cycle characteristics, excellent high-rate charge-discharge characteristics, and so forth, can be produced at high efficiencies and using little energy. The invention additionally provides a method of producing an electricity storage device, wherein this method uses an electrode obtained by the herein disclosed method of producing an electrode for an electricity storage device which uses this electrode can provide a favorable performance for, for example, a capacitor or secondary battery used as, e.g., a power source (electrical power source) for driving a motor mounted in a vehicle. Thus, according to the present invention, it is possible to provide the highly efficient and low-energy production of various types of electricity storage device electrodes having a desired performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
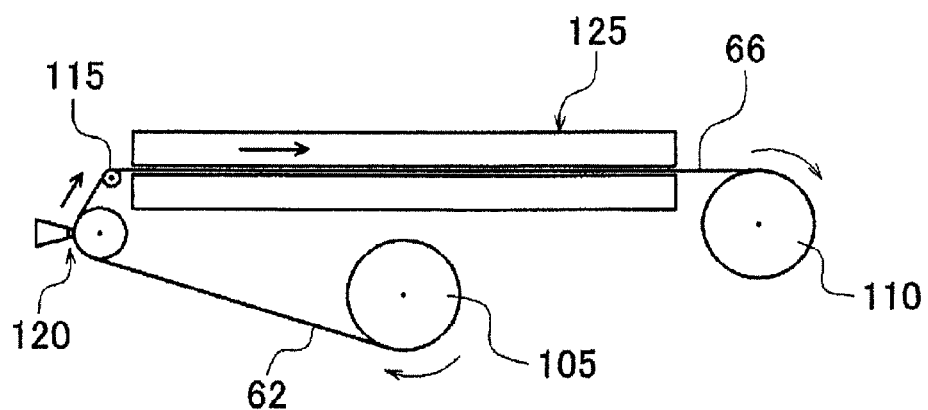
FIG. 1 is an explanatory drawing that schematically shows the structure of an exemplary embodiment of an electrode production apparatus.

An exemplary embodiments of the invention are described in the following. Matters required for the execution of the invention, but not included in the matters particularly described in this Specification, can be understood as design matters for the skilled person in the art based on the conventional art in the pertinent field. The invention can be implemented based on the contents of this Specification and the common general technical findings in this technical field.

The "electricity storage device" of this Specification refers in general to a device capable of repetitive charging, as typified by secondary batteries, capacitors (also called condensers), and so forth. This typically encompasses secondary batteries, e.g., lithium ion secondary batteries (including lithium ion polymer batteries), nickel hydride batteries, nickel-cadmium batteries, lead storage batteries, nickel-zinc batteries, and so forth, as well as capacitors such as lithium ion capacitors, electrical double layer capacitors, and so forth. "Electricity storage devices" encompassed by the invention are not limited to electricity storage devices in which the storage mechanism is a so-called chemical reaction (Faraday reaction), e.g., a secondary battery, but may also encompass electrical storage devices (also called "physical batteries") in which the storage mechanism is a so-called physical phenomenon (dielectric polarization) that is not accompanied (non-Faraday reaction) by a chemical reaction, e.g., electric double layer capacitors. In addition, the "active material" in this Specification encompasses electrode materials that can form an electrode in the aforementioned electricity storage devices. For example, the active material in a secondary battery refers to a material that can reversibly incorporate and release (typically insertion and desorption) a chemical species (for example, the lithium ion in a lithium ion secondary battery) that serves as a charge carrier. The active material in a capacitor, for example, refers to a material that can reversibly adsorb and desorb an electrolyte ion (cation, anion).

Exemplary embodiments of the method of producing electricity storage device electrodes are described in the following. This description will proceed using as an example the production of the positive electrode of a lithium ion secondary battery as an exemplary embodiment of an electrode for an electricity storage device. This positive electrode has a structure in which a positive electrode active material layer composed mainly of a positive electrode active material is formed on a current collector. In the following, the materials used to produce the positive electrode will be described first, followed by a detailed description of the method of producing the positive electrode.

The positive electrode current collector can be an electroconductive member made of a metal that has an excellent electroconductivity, and can be the same as the current collectors used for the positive electrodes of conventional nonaqueous electrolyte secondary batteries (typically lithium ion secondary batteries). For example, metals in which the main component is aluminum, nickel, titanium, iron, and so forth, can be used, and alloys of the metals can be used. Aluminum and aluminum alloys are more preferred. There are no particular limitations on the shape of the positive electrode current collector, and various shapes can be contemplated in conformity to, for example, the desired shape of the secondary battery. For example, various configurations are possible, e.g., rod shaped, plate shaped, sheet shaped, foil, mesh, and so forth. A positive electrode current collector in the form of an aluminum sheet is typically used.

The positive electrode active material layer is formed on the surface of this positive electrode current collector. The positive electrode active material layer is composed mainly of the positive electrode active material, and this is solidified with a binder and fixed on the positive electrode current collector. The positive electrode active material layer may as necessary contain an electroconductive material.

The positive electrode active material is a positive electrode active material that has the ability to realize the objects of the invention, but is not otherwise particularly limited as to composition or shape. A complex oxide containing lithium and at least one transition metal element is an example of a typical positive electrode active material. Examples are cobalt-lithium complex oxides ($LiCoO_2$), nickel-lithium complex oxides ($LiNiO_2$), and manganese-lithium complex oxides ($LiMn_2O_4$). Other examples are the so-called binary type lithium-containing complex oxides, which contain two species of transition metal elements, as represented by the nickel·cobalt system $LiNi_xCo_{1-x}O_2$ ($0<x<1$), the cobalt·manganese system $LiCo_xMn_{1-x}O_2$ ($0<x<1$), and the nickel·manganese system $LiNi_xMn_{1-x}O_2$ ($0<x<1$) and $LiNi_xMn_{2-x}O_4$ ($0<x<2$). Additional examples are the so-called ternary type lithium-containing complex oxides, which contain three species of transition metal elements, as represented by the general formula $Li(Li_aMn_xCo_yNi_z)O_2$ (a, x, y, and z in this formula are real numbers that satisfy $a+x+y+z=1$), and so-called solid solution-type lithium-excess transition metal complex oxides as represented by the general formula $xLi[Li_{1/3}Mn_{2/3}]O_2 \cdot (1-x)LiMeO_2$ (in this formula, Me is a single transition metal or two or more transition metals and x satisfies $0<x\leq1$).

Polyanion-type compounds as represented by the general formula $LiMAO_4$ (M is at least one metal element selected from the group consisting of Fe, Co, Ni, and Mn, and A is an element selected from the group consisting of P, Si, S, and V) are also examples of the above positive electrode active material. The compounds constituting such positive electrode active materials can, for example, be produced and prepared by conventional methods. For example, starting compounds, selected as appropriate in conformity to the composition of the intended positive electrode active material, are mixed in prescribed proportions and this mixture is calcined by suitable means. This can produce an oxide that will serve as the compound constituting the positive electrode active material. The method of producing the positive electrode active material (typically a lithium-containing complex oxide) itself is not in any way a characteristic feature of the invention.

While the form of the positive electrode active material is not strictly limited, the positive electrode active material produced as described above can be ground, granulated, and classified by suitable means. This can provide a powder of a positive electrode active material granulate that is substantially formed of secondary particles having a desired average particle size and/or particle size distribution. Considering the dispersibility of the paste to form the active material layer (the paste is described below), a positive electrode active material whose particle size (secondary particles) is in the range that is equal to or smaller than 20 μm is favorably used in the embodiment. For example, approximately 2 to 10 μm is preferred for the average particle size of the positive electrode active material. An average particle size of approximately 4 to 7 μm is more preferred. For the electrode of the embodiment, the "average particle size", unless specifically stated otherwise, denotes the particle size at a cumulative value of 50% in the particle size distribution measured using a particle size distribution measurement instrument based on a laser scattering·diffraction procedure. The particle size at a cumulative value of 50% is the particle size (number basis) of the particle corresponding to the median value of the total of the particles when the number of particles is counted from a small particle size.

There are no particular limitations on the electroconductive material. In those instances in which an electroconductive material is present in the positive electrode active material layer formed in the positive electrode of the embodiment, and the various electroconductive materials in use in conventional electricity storage devices of this type can be used. For example, a carbon material, e.g., carbon powder or carbon fiber, can be used as the electroconductive material. The carbon powder can be exemplified by various carbon blacks (for example, acetylene black, furnace black, Ketjen black) and by graphite powder. A single one of these may be used or two or more may be used. The average particle size of the secondary particles in the electroconductive material is preferably from about one five-hundredth to one-twentieth of the average particle size of the active material.

The binder functions to bind the particles of the electroconductive material present in the positive electrode active material layer to the particles of the positive electrode active material present in the positive electrode active material layer, and to bind these particles to the positive electrode current collector. This binder can be a polymer capable of being dissolved or dispersed in the solvent used during formation of the positive electrode active material layer. When, for example, an aqueous solvent is used as this solvent, polymers that dissolve in water (water-soluble) can be exemplified by cellulosic polymers such as carboxymethyl cellulose (CMC), methyl cellulose (MC), cellulose acetate phthalate (CAP), and hydroxypropylmethyl cellulose (HPMC), and by polyvinyl alcohol (PVA). Polymers that disperse in water (water-dispersible) can be exemplified by vinyl polymers such as polyethylene (PE) and polypropylene (PP); polyethylene oxide (PEO); fluororesins such as polytetrafluoroethylene (PTFE), tetrafluoroethylene perfluoroalkyl vinyl ether copolymer (PFA); vinyl acetate copolymer; and rubbers such as styrene-butadiene rubber (SBR) and acrylic acid-modified SBR resin (SBR latex). In those instances in which a nonaqueous solvent is used as the solvent, polymers such as polyvinylidene fluoride (PVDF), polyvinylidene chloride (PVDC), and polyacrylonitrile (PAN) are preferably used. In addition to its function as a hinder, the polymers provided as examples of the binder may also be used for the purpose of exhibiting the function of a thickener, or other additive, for the paste to form the electrode active material layer (this paste to form the electrode active material layer is also referred to below simply as paste).

An aqueous solvent or a nonaqueous solvent can be used as the solvent. The aqueous solvent can be exemplified by water and by compositions that use a mixed solvent (water-based solvent) composed mainly of water. The solvent other than water in this mixed solvent can be a single suitable selection or two or more suitable selections from organic solvents that can be uniformly mixed with water (lower alcohols, lower ketones, and so forth). N-methyl-2-pyrrolidone (NMP) is a favorable example of a nonaqueous solvent.

An exemplary embodiment of the method of the invention for producing an electrode for an electricity storage device is particularly described in the following. Here, the production of the positive electrode of a lithium ion secondary battery is described as a particular example. The method of producing this positive electrode encompasses the following steps.

A paste production step: a paste to form the positive electrode active material layer is produced, in which aggregates of a solids fraction material that contains at least an electrode active material and a binder are dispersed in the prescribed solvent.

A coating step: this paste is coated on the surface of a positive electrode current collector.

A drying step: the paste-coated positive electrode current collector is dried to form a positive electrode active material layer formed of the solids fraction material in the paste.

A paste is produced in the paste production step, this paste being a paste to form the positive electrode active material layer. Specifically, a solids fraction material that includes the previously described positive electrode active material, a binder, and typically an electroconductive material is dispersed in the prescribed solvent in order to prepare a paste to form the positive electrode active material layer. The dispersion of the solids fraction material in the solvent is carried out, for example, by introducing the solids fraction material, e.g., the previously described positive electrode active material, electroconductive material, binder, and so forth, the solvent, and as necessary additives such as a dispersing agent, thickener, and so forth, into a mixer and mixing. This mixer can be the conventional mixer as used in the production of a paste to form an active material layer. For example, devices capable of producing the paste and referred to as kneaders, stirrers, dispersers, mixers, and so forth, can be used.

There are no particular limitations on the blend in this solids fraction material as long as this blend is in a range that achieves the objects of the invention. Considered in approximate terms, when an electroconductive material is used, for example, approximately 1 to 30 mass parts (preferably approximately 2 to 20 mass parts, for example, about 5 to 15 mass parts) is used per 100 mass parts of the positive electrode active material (electrode active material). The electroconductive material may be preliminarily incorporated (for example, mixed, coated, or supported) in the electrode active material. The binder can be used at, for example, 0.5 to 10 mass parts per 100 mass parts of the positive electrode active material. In addition, when, for example, the electrode active material, the electroconductive material, and the binder are used as the solids fraction material, these are preferably blended so as to provide a mass ratio of electrode active material:electroconductive material:binder of 97 to 80:2 to 15:1 to 5 and more preferably 95 to 86:3 to 10:2 to 4.

The solids fraction materials in this paste, i.e., the positive electrode active material, binder, and electroconductive material, can aggregate with each other to form aggregates. In addition, these aggregates are present in a dispersed state in the solvent. The production method of the embodiment is characterized by the state of the produced paste (state of the dispersion). That is, the paste is produced so as to have the following characteristics (A) to (C) and to thereby be uniformly and highly dispersed.

(A) The content ratio of the solids fraction material in the paste is 60 to 80 mass %.
(B) The abundance ratio for aggregates with a particle size that is equal to or smaller than 20 μm is at least 99%.
(C) The viscosity at 25° C. and a shear rate of 40 s$^{-1}$ (or less) is 200 to 5,000 mPa·s.

The content ratio of the solids fraction material in the paste is set to 60 to 80 mass % in (A). This content ratio is a clearly higher value than the solids fraction material content ratio (typically 50 to 60 Mass %) in an ordinary paste to form a positive electrode active material layer. In the production method of the embodiment, a greater solids fraction material content ratio in the paste, i.e., a lower amount of solvent, is preferred because this makes it possible to further reduce the time and energy consumed by solvent removal (drying) in the downstream drying step. As a consequence, the content ratio of the solids fraction material in the paste is at least 60 mass % in this embodiment. When the solids fraction material content ratio is not at least 60 mass %, this results in, for example, it is difficult to shorten the drying time. However, an excessively large solids fraction material content ratio in the paste (i.e., an overly low amount of solvent) is unfavorable because the coatability by the paste on the current collector surface is then impaired in the coating step, which is the next step. A poor coatability results in, for example, a disorderly surface condition for the positive electrode active material layer that is formed, facile production of cracking and fissuring during the drying step, and a lowering of the ability of the positive electrode active material layer to fix to the surface of the current collector. Accordingly, the solids fraction material content ratio is also set at a value that is equal to or smaller than 80 mass %. The solids fraction material content ratio in the paste is preferably 65 to 75 mass % and more favorably is 68 to 72 mass %.

The aforementioned (B) sets the size of the aggregates that are dispersed in the paste. It is generally thought that increasing the particle size of the positive electrode active material and aggregates present in the paste will be effective for achieving the solids fraction material content ratio in the paste that is set by (A), i.e., reducing the amount of solvent (this can also be evaluated by, for example, the amount of dibutyl phthalate (DBP) absorption) and lowering the surface area by increasing the particle size of the aggregates. However, increasing the particle size of the aggregates is disfavored because it conflicts with improving electrode performance. The particle size of the aggregates in the paste of the embodiment is therefore set by the abundance ratio (%) of aggregates with a size no larger than 20 μm. By making the aggregate particle size a size that is equal to or smaller than 20 μm and thereby bringing about a high degree of dispersion of the aggregates in the paste, the solids fraction material content ratio in the paste set by (A) is realized while the electrode performance is maintained. The particle size and abundance ratio of these aggregates can be measured, for example, using an instrument for measuring particle size distributions by a laser diffraction scattering method. This measurement by laser diffraction scattering may be problematic in those instances in which the paste contains a high solids fraction material content ratio (solids fraction concentration). However, because the aggregates are highly dispersed in the paste of the embodiment, the paste sample taken for measurement can be diluted (for example, diluted 50-fold) and the particle size distribution can then be measured in a state that does not influence the particle size of the aggregates.

The paste is produced in the production method of the embodiment so as to provide an abundance ratio of at least 99% for the aggregates with a particle size that is equal to or smaller than 20 μm. This production can be carried out, for example, by passing the paste, after mixing, through a filter with a pore size of 20 μm. The implementation of this feature makes it possible to substantially reduce the time required in the downstream drying step to dry the solvent from the paste having, for example, a solids fraction material content ratio of at least 60 mass %. The abundance ratio of aggregates with a particle size that is equal to or smaller than 20 μm is preferably at least 99.7 number %, more restrictedly at least 99.8%, and even more preferably 100%.

The aforementioned (C) specifies the viscosity of the paste at 25° C. and a shear rate of 40 s$^{-1}$. This viscosity can be measured using an instrument for measuring viscoelasticity (rheometer). For example, it can be very accurately measured using a rotary rheometer (for example, an MCR301) from Anton Paar. A viscosity of 200 to 5,000 mPa·s can encompass the standard viscosity range for a common paste to form the positive electrode active material layer. That is, the coatability of the paste on the current collector can be established in an appropriate range. However, when a paste satisfies the conditions (A) and (B) given above, the viscosity generally assumes a very high value and it becomes quite difficult to realize a value less than or equal to 5,000 mPa·s.

In a paste to form a positive electrode active material layer, a plurality of positive electrode active material particles typically aggregate with, for example, the binder and electroconductive material particles, to form an aggregate. The size (particle size) of this aggregate can also be reduced by using a positive electrode active material that has a microfine particle size. However, as the solids fraction material content ratio in the paste is increased, the distance between the aggregates is narrowed and a coarsening tends to occur due to aggregation of the aggregates with each other and/or the viscosity tends to rise. Due to this, it is not an easy matter to satisfy conditions (A) to (C) even when a positive electrode active material having a microfine particle size is used.

In contrast to this, almost none of the aggregates dispersed in the paste to form a positive electrode active material layer in the production method of the embodiment reside in a configuration in which positive electrode active material particles are aggregated with one other. This aggregate is produced so that the binder, electroconductive material particles, and so forth, are aggregated to substantially a single positive electrode active material particle. That is, almost none of the positive electrode active material particles in the paste are aggregated and they retain a highly dispersed state. The high degree of dispersion in the highly concentrated paste can be realized by managing the particle size distribution range of the aggregates by, for example, introducing a suitable dispersing agent at a suitable time during paste production. Doing this makes it possible for the production method to realize—with a paste having a solids fraction material content ratio of at least 60 mass % as stipulated in (A) above—the viscosity of 200 to 5,000 mPa·s at 25° C. and a shear rate of 40 s$^{-1}$ of (C) above, while at the same time maintaining the particle size of at least 99% of the aggregates at a size that is equal to or smaller than 20 μm as stipulated in (B) above. The viscosity of the paste at 25° C. and a shear rate of 40 s$^{-1}$ is preferably brought to 400 to 3,000 mPa·s and more preferably is brought to 500 to 1,500 mPa·s.

The "20 μm particle size" that forms the basis for specifying the aggregate size (range of the particle size distribution) in (B) can be varied, for example, in the range from about 10 to 20 μm. That is, production is carried out so the positive electrode active material particles in the paste maintain a highly disperse state with largely no aggregation between the positive electrode active material particles. Accordingly, depending on the particle size of the positive electrode active material used, the particle size for specifying the size of the aforementioned aggregates may be varied so as to provide a state in which the positive electrode active material particles are not aggregated with each other. As a guideline, this particle size can be set at a size that is about twice the average particle size of the positive electrode active material used. This "twice the average particle size" is assumed to be the allowable range when the active material particles are present individually or when up to about several active material particles may at a low probability aggregate to each other. The particle size distribution of the positive electrode active material used is also considered. In specific terms, and taking the use of a positive electrode active material having an average particle size of 7 μm as an example, 14 μm may then be used as the particle size for specifying aggregate size. That is, condition (B) can then be thought of as production so as to provide an abundance ratio of at least 99% for aggregates with a particle size that is equal to or smaller than 14 μm.

The paste to form the active material layer may be coated on the current collector using various conventional coating devices. For example, the paste may be coated on one or both sides of the current collector using a coater. The coater may be any coater capable of coating the paste on the current collector, and, for example, a slit coater, die coater, gravure coater, roll coater, doctor blade coater, or comma coater can be used.

FIG. 1 shows an electrode production apparatus 100 that forms a positive electrode active material layer by coating and drying a paste to form a positive electrode active material layer on the surface of a long-sheet-shaped current collector. As schematically shown in FIG. 1, the electrode production apparatus 100 is provided with a wind-out roll 105, a paste coating section 120, a drying oven 125, and a wind-up roll 110. A positive electrode current collector 62 is supplied from the wind-out roll 105 in the electrode production apparatus 100 and the produced paste is coated on the positive electrode current collector 62 in the paste coating section 120. This paste coating section 120 is provided with a conventional coating apparatus as described above. In the paste coating section 120, the paste can be suitably coated on the positive electrode current collector 62 by using a suitable coating device, for example, a slit coater, die coater, or gravure coater. The coating weight of the positive electrode active material on the positive electrode current collector 62 can, for example, be freely set in conformity to the application of the secondary battery that will be provided with the intended electrode. It can be set as appropriate in the range of, for example, approximately 10 to 50 mg/cm$^2$.

As shown in FIG. 1, a positive electrode sheet 66 (positive electrode), formed of a positive electrode active material layer 64 formed on the positive electrode current collector 62, is wound up on the wind-up roll 110. The positive electrode sheet 66 may be pressed (compressed) as necessary. The pressing (compression) method here may be a conventional compression method, e.g., a roll press method, platen press method, and so forth. This makes it possible to adjust the thickness of the positive electrode active material layer 64. To adjust the thickness of the positive electrode active material layer 64, this thickness may be measured with a thickness measurement device, the pressing pressure may be adjusted, and a plurality of compressions may be performed to achieve the desired thickness.

In the drying step, the solvent is removed from the paste coated on the surface of the positive electrode current collector as described above and the paste is thereby dried. For example, the paste-coated positive electrode current collector 62 is transported in the example shown in FIG. 1 within a drying oven 125 while being subjected to a constant tension applied by a tension roller 115. During passage through the drying oven 125, drying is carried out by evaporating the solvent from the paste to form a positive electrode active material layer, that has been formed on the positive electrode current collector 62. This results in the formation of a positive electrode active material layer on the current collector.

So-called high-rate drying can be used for drying in the production method. The drying temperature is desirably not greater than the melting point of the binder and can be about 50 to 175° C. The drying temperature is preferably 70 to 150° C. It is difficult to set limits on the drying time because the drying time depends on the coating weight of the paste; however, as guideline the drying time can be set, for example, in the range below 450 seconds in the range of about 10 to 50 mg/cm². It is typically about 40 to 300 seconds and is preferably 50 to 150 seconds. Drying is also advantageously accompanied by air blow at a wind velocity of about 1 to 15 m/s. This high-rate drying can be executed specifically by passing the paste-coated positive electrode current collector 62 within an oven set to a set temperature of 50 to 175° C., for example, for 40 to 300 seconds while blowing air at a wind velocity of about 1 to 15 m/s. For example, for a coating weight (weight per unit area) for the paste on the current collector of 25 to 50 mg/cm², the drying time can be brought to less than or equal to 120 seconds by carrying out this high-rate drying. The drying time in this case can be shortened to not more than 90 seconds and even more to the level that is equal to or shorter than 72 seconds.

The high-rate drying described above can substantially shorten the drying time as compared to the usual drying conditions (drying conditions: temperature of 100 to 130 (° C.), time of 90 to 180 (s), wind velocity of 8 to 12 (m/s)). This therefore makes possible the realization of efficient drying in a short period of time. In addition, in the production method, the state of the dispersion in the paste to form the positive electrode active material layer is controlled to a state that is well adapted for the high-rate drying described above. Accordingly, even when subjected to high-rate drying, the positive electrode active material layer will dry normally, for example, without the production of creases, wrinkles, cracks, fissures, and so forth. Moreover, a high-quality drying can similarly be carried out at a high rate, for example, even when the areal weight of the paste to form the positive electrode active material layer has been set at a value as large as 40 mg/cm² or more. When the high-rate drying described above is carried out on a conventional paste to form a positive electrode active material layer that has not been produced by the production method of the invention, creases and fissures appear in the surface of the positive electrode active material layer during the course of drying. This production of creases and fissures substantially impairs the electrode performance of the positive electrode. A consideration of the drying conditions and some type of special drying means thus become necessary when submitting an ordinary paste to form a positive electrode active material layer to high-rate drying.

The means for carrying out this drying in the production method of the embodiment should be able to remove the excess volatile component but is not otherwise particularly limited. For example, suitable drying devices such as hot wind devices, various infrared devices, electromagnetic induction devices, and microwave devices can be used. This realizes a method of producing an electrode for a secondary battery, in which method the time and energy required to dry the paste for producing the electrode active material layer have been reduced. In addition, due to the uniform distribution of the binder and electroconductive material, the secondary battery electrode yielded by this production method also has an improved durability.

An embodiment of the method of producing a lithium ion secondary battery using the above-described positive electrode will be described in the following. A negative electrode, separator, and so forth, suitable for use in combination with the positive electrode (positive electrode sheet 66) described above will be explained first. The lithium ion secondary battery produced here can have the same structure as a conventional lithium ion secondary battery. The negative electrode current collector that constitutes the negative electrode here is preferably an alloy composed mainly of, for example, copper, nickel, titanium, stainless steel, and so forth. The shape of the negative electrode current collector can be the same rod shape, plate shape, foil, sheet shape, or mesh as the shape for the positive electrode. A sheet-shaped negative electrode current collector is typically used.

The negative electrode active material present in the negative electrode active material layer formed in the negative electrode should be a material capable of incorporating and discharging lithium, but is not otherwise particularly limited. A typical example is a powder carbon material that contains, for example, graphite. For example, graphite particles can be preferably used. Otherwise, specifically, for example, a metal such as Si, Ti, Ge, Sn, Pb, Al, Ga, In, Zn, As, Sb, or Bi, or a metal alloy composed mainly of these metal elements, or a metal material formed of a metal compound (preferably a metal oxide such as a lithium titanium oxide ($Li_4Ti_5O_{12}$)) may be made a constituent metal element. Also suitable for use is, for example, a highly electroconductive particulate negative electrode active material having a surface that is thoroughly coated with a carbon film. In this case, an electroconductive material need not be present in the negative electrode active material layer or the electroconductive material content ratio may be lower than the conventional content ratio.

In addition to the previously described negative electrode active material, the negative electrode active material layer formed in the negative electrode may contain, as necessary, a single material or two or more materials that may be blended in the positive electrode active material layer described above. These materials may be the same materials capable of functioning as a binder, electroconductive material, dispersing agent, and so forth, as provided above as examples of constituent materials of the positive electrode active material layer. The binder here is not limited to water-based binders and a solvent-based binder such as polyvinylidene fluoride (PVDF) may also be used.

The fabrication of the negative electrode typically also includes the production of a paste to form the negative electrode active material layer, in which paste a solids fraction material containing at least the negative electrode active material and a binder is dispersed in a suitable solvent (for example, water or an organic solvent) that is the same as is conventionally used. The thereby produced paste to form a negative electrode active material layer is coated and dried on the negative electrode current collector and then as necessary compressed (pressed) to yield a negative electrode that is provided with a negative electrode current collector and a negative electrode active material layer formed on this negative electrode current collector. The production of this negative electrode may also be carried out in accordance with the electrode production method or its production of the present invention may employ the same methods as conventionally used. A detailed description of the conventional methods will not be provided since they do not characterize the invention.

The same separators as conventionally used may be used as the separator with the positive electrode and negative electrode. For example, a porous sheet made of a resin (a microporous resin sheet) can preferably be used. The constituent material of this porous sheet is preferably a polyolefin resin such as polyethylene (PE), polypropylene (PP), polystyrene, and so forth.

In particular, a porous polyolefin sheet, e.g., a single-layer sheet such as a PE sheet or PP sheet, a two-layer sheet in which a PE layer is laminated with a PP layer, or a three-layer sheet in which a single PE layer is sandwiched between two PP layers, can be favorably used. The separator may also be unnecessary when a solid electrolyte or an electrolyte gel is used as the electrolyte (i.e., the electrolyte itself can function as the separator in such cases).

For the electrolyte, the same nonaqueous electrolytes (typically an electrolyte solution) as heretofore used in lithium ion secondary batteries can be used without particular limitation. This nonaqueous electrolyte typically has a composition in which a lithium salt capable of functioning as an electrolyte is present in a suitable nonaqueous solvent (organic solvent). A suitable selection from the lithium salts heretofore used in lithium ion secondary batteries can be used as the electrolyte under consideration.

This lithium salt can be exemplified by $LiPF_6$, $LiClO_4$, $LiAsF_6$, $Li(CF_3SO_2)_2N$, $LiBF_4$, $LiCF_3SO_3$, and so forth. Only a single species can be used by itself as this electrolyte, or a combination of two or more species can be used. $LiPF_6$ is a particularly preferred example. The nonaqueous solvent can be exemplified by carbonates such as ethylene carbonate (EC), ethyl methyl carbonate (EMC), dimethyl carbonate (DMC), diethyl carbonate (DEC), and propylene carbonate (PC). A single nonaqueous solvent may be used by itself or a combination of two or more may be used.

An embodiment of a method of producing a lithium ion secondary battery that is provided with a positive electrode sheet (positive electrode) produced by the above method of producing an electricity storage device electrode is described in the following with reference to the figures, but the invention is not intended to be limited to this exemplary embodiment. Thus, with the exception that the electrode used is produced by the above method of producing an electricity storage device electrode, there are no particular limitations on the composition and form of the electrode active material used or on the type and shape (outer shape and size) of the electricity storage device that is fabricated. For example, when a lithium ion secondary battery is produced as the electricity storage device, the outer battery case can have, for example, a prismatic or cylindrical shape or may have a small button shape. In addition, it may be a thin sheet type in which the outside is made of, for example, a laminate film. A prismatic battery is described in the following exemplary embodiment.

Figure 2:
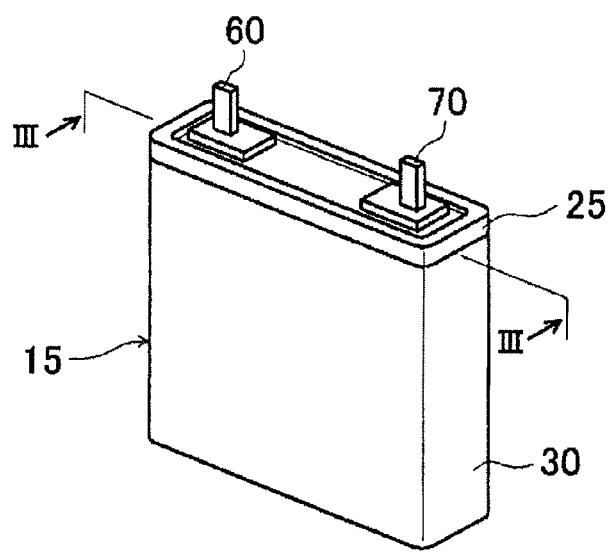
FIG. 2 is a perspective drawing that schematically shows the outer shape of an exemplary embodiment of an electricity storage device (a lithium ion secondary battery in this case)
Figure 3:
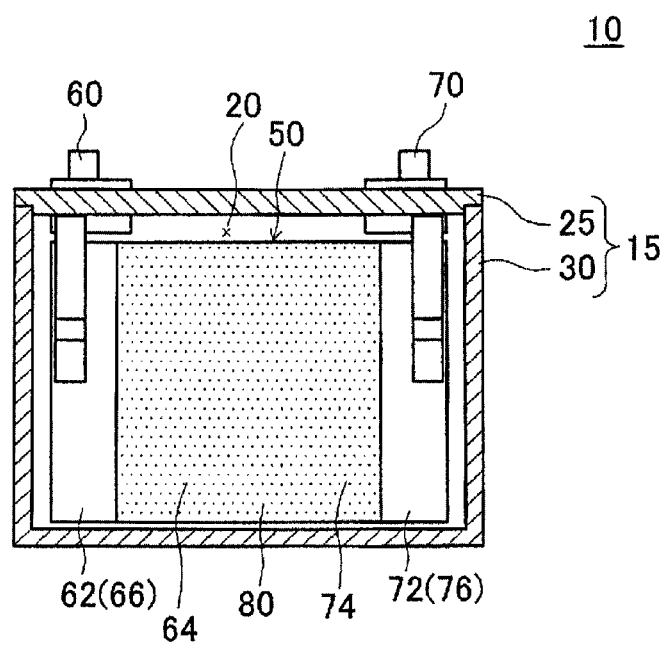
FIG. 3 is a vertical cross-sectional drawing along the III-III line in FIG. 2.

The dimensional relationships (length, width, thickness, and so forth) in the figures do not necessarily reflect actual dimensional relationships. FIG. 2 is a perspective diagram that schematically illustrates the lithium ion secondary battery according to the exemplary embodiment under consideration, FIG. 3 is a vertical cross-sectional diagram along the III-III line in FIG. 2. As shown in FIG. 2 and FIG. 3, the lithium ion secondary battery 10 according to this exemplary embodiment is provided with an electrode assembly 50 made of the constituent materials described above (active materials for each of the positive and negative electrodes, current collectors for each of the positive and negative electrodes, separators, and so forth) and with a prismatic (typically a flat cuboid shape) battery case 15 that accommodates the electrode assembly 50 and a suitable nonaqueous electrolyte (typically an electrolyte solution).

The case 15 is provided with a box-shape case main body 30, in which one of the narrow surfaces in the flat cuboid shape forms an opening 20, and with a lid 25, which is attached to the opening 20 (for example, by welding) and which closes this opening 20. The same materials as used in ordinary lithium ion secondary batteries can be used as appropriate for the materials constituting the case 15, but there is no particular limitation here. For example, a metal container (for example, of aluminum, steel, and so forth) or a synthetic resin container (for example, a polyolefin resin or a high-melting-point resin such as a polyimide resin) is preferably used. The case 15 according to this exemplary embodiment is made, for example, of aluminum.

The lid 25 is formed in a rectangular shape that matches the shape of the opening 20 of the case main body 30. A positive electrode terminal 60 and a negative electrode terminal 70 for external connection are each disposed on the lid 25. A portion of these terminals 60, 70 is formed to extend toward the outside of the case 15 from the lid 25. In the same manner as for the case of a conventional lithium ion secondary battery, a safety valve (not shown in the figure) is disposed in the lid 25 in order to discharge from the case 15 the gas that is produced within the case 15 when a battery is in an abnormal state. The safety valve should be provided with a mechanism that opens and discharges the gas to the outside of the case 15 when the pressure within the case 15 rises and exceeds a prescribed level, but otherwise can be used without particular limitation.

As shown in FIG. 3, the lithium ion secondary battery 10 is provided in this exemplary embodiment with a wound electrode assembly 50. The electrode assembly 50 is accommodated in the case main body 30 in a configuration in which the winding axis lies sideways (that is, the direction whereby the opening 20 is positioned in the transverse direction with respect to the winding axis). To form the electrode assembly 50, a positive electrode sheet (positive electrode) 66, which has the positive electrode active material layer 64 formed on the surface of a long-sheet-shaped positive electrode current collector 62, and a negative electrode sheet (negative electrode) 76, which has a negative electrode active material layer (electrode active material layer) 74 formed on the surface of a long-sheet-shaped negative electrode current collector (electrode current collector) 72, are layered with two long-sheet-shaped separator sheets 80 and wound and the resulting electrode assembly 50 is compressed and flattened from the side surface direction to form a flat shape.

The positive electrode active material layer 64 is not formed at the one edge of the wound positive electrode sheet 66 extending along its longitudinal direction and the positive electrode current collector 62 is thereby exposed, while the negative electrode active material layer 74 is also not formed at the one edge of the wound negative electrode sheet 76 extending along its longitudinal direction and the negative electrode current collector 72 is thereby exposed. A positive electrode terminal 60 is joined to this exposed edge of the positive electrode current collector 62 and is thereby electrically connected to the positive electrode sheet 66 of the flattened wound electrode assembly 50. Similarly, a negative electrode terminal 70 is joined to the exposed edge of the negative electrode current collector 72 and is thereby electrically connected to the negative electrode sheet 76. The positive and negative electrode terminals 60, 70 can be joined to the positive and negative electrode current collectors 62, 72, respectively, by, for example, ultrasound welding or resistance welding. With the exception that an electrode produced according to the electrode production method of the embodiment is used as the positive electrode or negative electrode (as the positive electrode sheet 66 here), the members themselves and the materials constituting the wound battery assembly 50 with the structure described above may be the same as in the electrode assembly in a conventional lithium ion secondary battery and are not particularly limited.

In the exemplary embodiment under consideration, the positive electrode sheet 66 fabricated as described above and the negative electrode sheet 76 are wound interleaved with two separators (for example, a porous polyolefin resin) 80. By doing this, the wound electrode assembly 50 is accommodated within the case main body 30 with the winding axis of the resulting wound electrode assembly 50 lying sideways. In addition, a nonaqueous electrolyte solution in the form of an EC+DMC mixed solvent (at, for example, a mass ratio of 1:1) that contains a suitable amount (for example, a concentration of 1 M) of a suitable supporting salt (for example, a lithium salt such as $LiPF_6$) is introduced. After this, the lithium ion secondary battery 10 according to this exemplary embodiment is produced by mounting and sealing the lid 25 in the opening 20 of the case main body 30. The opening 20 of the case main body 30 may be sealed, for example, by welding the lid 25 to the case main body 30. This welding may be performed by, for example, laser welding.

In the exemplary embodiment described above, the above method of producing an electrode for a lithium ion secondary battery is used to produce the positive electrode sheet 66. This embodiment is not limited to the positive electrode, however, and, for example, it could also be used for the production of the negative electrode of a lithium ion secondary battery. In addition, the exemplary embodiment described above is directed to the example of a lithium ion secondary battery 10, but the invention is not limited to lithium ion secondary batteries and can also be applied to the production of other electricity storage devices. For example, it can be applied to the electrodes (positive electrode and negative electrode) of a secondary battery such as a nickel hydride battery and to the electrodes (positive electrode and negative electrode) of capacitors such as lithium ion capacitors and electrode double layer capacitors. In this case, high-rate drying can then be used during electrode production and the drying time can be substantially shortened, and as a result the time and energy required for drying can be substantially reduced. Thus, a reduction in the production time and energy can also be contemplated for secondary battery production.

In the specific examples that follow, electricity storage device electrodes (in this case, the positive electrode for a lithium ion secondary battery) were fabricated by the production method described in the preceding and this production method was evaluated.

In order to produce the positive electrode for a lithium ion secondary battery, a paste to form a positive electrode active material layer was first prepared. That is, a solids fraction material made of a positive electrode active material, an electroconductive material, and a binder was blended in a range that provided a mass ratio of positive electrode active material:electroconductive material:binder blend of 91 to 93:6 to 4:3. This solids fraction material was mixed and stirred with a prescribed amount of solvent and as necessary with a dispersing agent, and a paste to form a positive electrode active material layer was produced by thoroughly dispersing the solids fraction material aggregates in the solvent. The following materials were used in the solids fraction material: positive electrode active material: $LiNi_{1/3}Mn_{1/3}Co_{1/3}O_2$ (average particle size: 10 μm); electroconductive material: acetylene black (AB) (average primary particle size: 48 nm); binder: polyvinylidene fluoride (PVDF); also, N-methylpyrrolidone (NMP) was used for the solvent and a basic triazine derivative was used for the dispersing agent.

A 15 μm-thick aluminum foil was prepared as the positive electrode current collector, and the aforementioned paste to form a positive electrode active material layer was coated on both sides of the positive electrode current collector. With regard to the coating weight (areal weight) of the paste on the positive electrode current collector, coating was carried out to provide a post-drying positive electrode active material layer of 20 $mg/cm^2$ on one side of the current collector and a total of 40 $mg/cm^2$ for both sides. The paste-coated current collector was then submitted to high-rate drying. This high-rate drying was carried out while the paste-coated current collector was travelling through a tunnel drying oven. The interior of the drying oven was divided into a first zone, a second zone, and a third zone considered from the entrance, and a plurality of spot fans were disposed so that air can be blown onto both sides of the electrode in each zone. Conditions such as the drying temperature, spot fan on/off, and wind velocity could be set on a zone-by-zone basis. The high-rate drying conditions were as follows in order to avoid an abrupt drying. In only the first zone, which was on the entrance side of the drying oven, the drying temperature was 100° C. and only two fans on the lower side of the electrode were operated to blow air at a wind velocity of 5 m/s. In the ensuing second zone and third zone, the drying temperature was 150° C., and three fans on the upper side of the electrode and two fans on the lower side were operated to blow air at a wind velocity of 5 m/s. After drying, the coating was pressed to produce a positive electrode sheet provided with a positive electrode active material layer.

The pastes to form a positive electrode active material layer were produced by setting the solids fraction material blend in the pastes to form a positive electrode active material layer so as to provide a mass ratio of positive electrode active material: electroconductive material:binder of 91 to 93:6 to 4:3; by varying the solids fraction material content ratio in the paste over five values from 60 to 73 mass %; and by dispersing in the solvent along with a dispersing agent. Thus, paste 1 had a solids fraction material content ratio of 73 mass %; paste 2 had a solids fraction material content ratio of 68 mass %; paste 3 had a solids fraction material content ratio of 64 mass %; paste 4 had a solids fraction material content ratio of 62 mass %; and paste 5 had a solids fraction material content ratio of 60 mass %. In order to check whether there was a timewise variation in the state of the dispersion of the aggregates in the paste, a paste 6 was prepared by leaving sample 5, in which the solids fraction material content ratio was 60 mass %, to place for approximately 24 hours.

Figure 4:
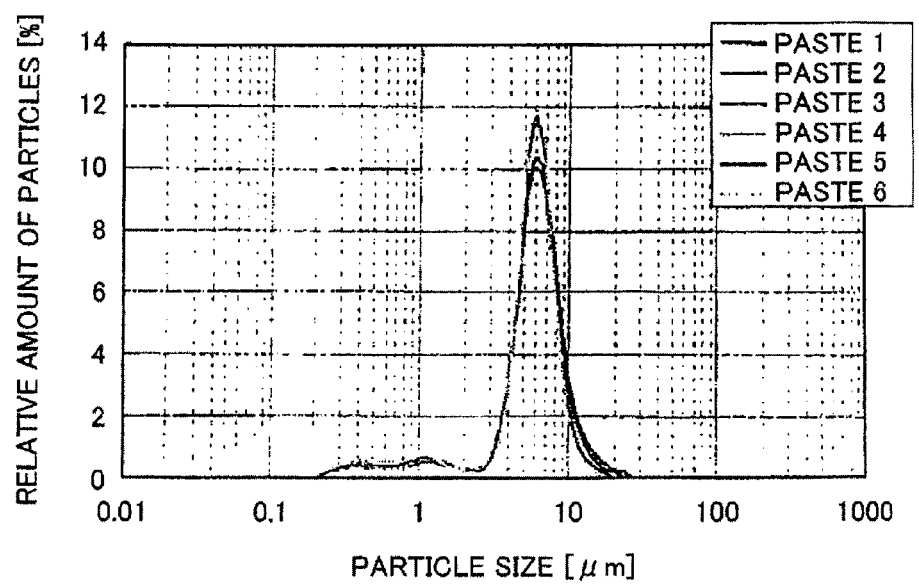
FIG. 4 is a diagram that shows the particle size distribution of the aggregates for an exemplary embodiment of the paste to form a positive electrode active material layer.

The particle size distribution of the aggregates in the paste was measured for these pastes 1 to 6 and the results are shown in FIG. 4. The particle size distribution of the aggregates was measured using a laser diffraction-based particle size distribution analyzer (MT3300 from Nikkiso Co., Ltd.). Pastes 1 to 6 were highly concentrated solutions and as a consequence were diluted 50-fold and the particle size distribution was then measured in a state that did not influence the particle size of the aggregates. As may be understood from FIG. 4, it was confirmed that the electrode production method of the embodiment, through the use of a positive electrode active material for which the average particle size (or the particle size distribution) has been judiciously managed, makes possible the precise production—at a solids fraction material content ratio (solids fraction concentration) between 60 and 73 mass %—of a paste to form a positive electrode active material layer. Moreover, it was shown that all of pastes 1 to 6 had an abundance ratio of at least 99.85% for particles with a particle size that is equal to or smaller than 20 µm, exhibited almost no aggregation of the active material with itself, and exhibited a highly disperse state. In addition, the viscosity at 25° C. and a shear rate of 40 s$^{-1}$ was in all instances in the range from 200 to 5,000 mPa·s. It was confirmed from the particle size distribution for paste 6 that there had been no formation in the paste held for approximately 24 hours of very large aggregates by the further aggregation of the aggregates with each other and that the highly disperse state had been maintained for as long as at least approximately 24 hours.

For sample 1, a paste was prepared by setting the solids fraction material blend in the paste to form a positive electrode active material layer so as to provide a mass ratio of positive electrode active material:electroconductive material:binder of 91:6:3 and by setting the solids fraction material content ratio (non-volatile value (NV)) in the paste to 52 mass %. Using this paste, a positive electrode was then produced according to the production method described above. The paste for this sample 1 was produced without adding a dispersing agent. Sample 1 is a positive electrode prepared according to a typical conventional method of producing positive electrodes, and the production method of the embodiment was not used during paste production for sample 1. Measurement of the viscosity at 25° C. and 40 s$^{-1}$ on the sample 1 paste to form a positive electrode active material layer gave 2,782 mPa·s, as shown in Table 1. The viscosity was measured using a rheometer (an MCR301 from Anton Paar). For the drying step, a current collector coated with the sample 1 paste was first submitted to the high-rate drying described above. When this was done, cracks were produced in the surface of the paste coated on the positive electrode current collector. The drying conditions were therefore varied in order to check the drying limit time, which is the shortest time in which drying can be completed without the appearance of cracks and the like. As a result, the drying limit time for sample 1 was 450 seconds. The time required for drying was determined by measuring the amount of NMP, which was used as the solvent, by gas chromatography. Thus, from the start of drying, gas was sampled in the oven from near the cross section of the edge of the sample 1 paste to form a positive electrode active material layer and the NMP level was measured by gas chromatography: It was determined whether drying was complete at the time point at which NMP was not detected. The presence/absence of cracking was evaluated by visually checking the electrode after drying.

In samples 2 to 8, pastes to form a positive electrode active material layer were prepared by changing the viscosity by adjusting the solids fraction material content ratio and solids fraction blend in the sample 1 paste to form a positive electrode active material layer. Using these pastes, positive electrodes were then produced according to the production method described above. The pastes of samples 2 to 8 were produced with the addition of the dispersing agent. The solids fraction material content ratio (NV) and the viscosity (25° C., 40 s$^{-1}$) were measured on the pastes used for the production of the resulting samples 2 to 8, and these are given in Table 1 below. The drying limit time in the drying step was also measured for samples 2 to 8, and the "time savings", which is the time saved in comparison to the drying limit time for the paste of sample 1 (450 s), is also given in Table 1.

TABLE 1

| sample | NV (mass %) | viscosity (mPa · s) | time savings (s) |
|---|---|---|---|
| 1 | 52 | 2,782 | 0 |
| 2 | 61 | 5,614 | 0 |
| 3 | 60 | 7,000 | 0 |
| 4 | 60 | 4,730 | 180 |
| 5 | 59 | 18,900 | 0 |
| 6 | 57 | 12,287 | 0 |
| 7 | 55 | 5,933 | 10 |
| 8 | 54 | 4,365 | 0 |

As may be understood from Table 1, for samples 5 to 8, in which the solids fraction material content ratio of the paste was less than 60 mass %, due to the large amount of solvent the drying time of the paste either could not be shortened or could be shortened by only a very brief time—even at different paste viscosities. In addition, even in the case of samples 2 and 3, in which the solids fraction material content ratio in the paste was at least 60 mass %, the drying time of the paste could not be shortened because the viscosity of the paste was higher than 5,000 mPa·s. In contrast to this, for sample 4, in which the solids fraction material content ratio of the paste was brought to at least 60 mass % and the viscosity was made not more than 5,000 mPa·s, it was shown that the paste drying time could be shortened by a substantial 180 seconds (40%) from 450 seconds. This confirmed that a substantial effect in terms of shortening the paste drying time is obtained by making the solids fraction material content ratio at least 60 mass % and making the viscosity not more than 5,000 mPa·s.

Figure 5:
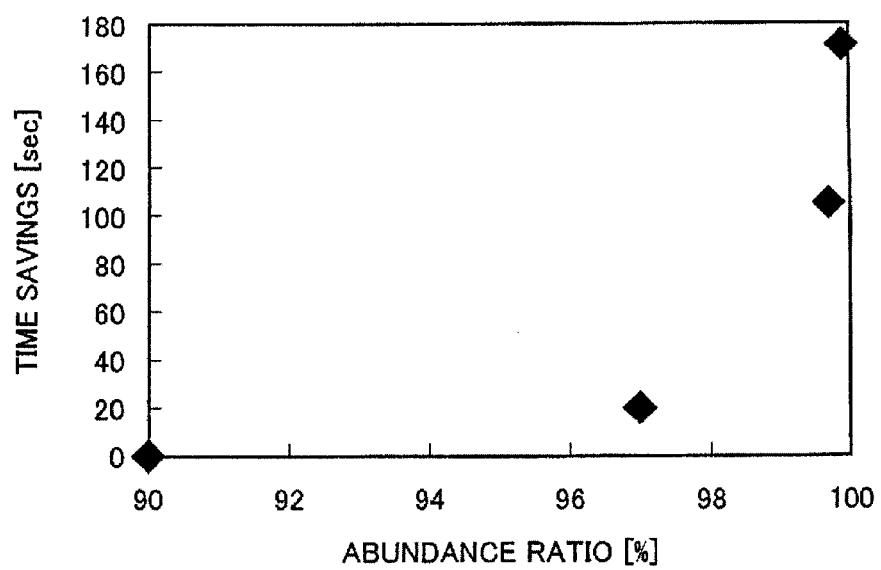
FIG. 5 is a diagram that shows the abundance ratio for aggregates with a particle size that is equal to or smaller than 20 μm in an exemplary embodiment of the paste to form a positive electrode active material layer.

With samples 9 to 13, the solids fraction material content ratio in the paste to form a positive electrode active material layer was held constant at 60 mass % and the abundance ratio of the aggregates with a particle size that is equal to or smaller than 20 µm dispersed in the paste was varied using the mixing conditions. Specifically, the mixer was a multishaft stirrer that was equipped with a planetary mixer and a dispersing mixer as a kneading machine; their rotation rates were set at 35 rpm/3,000 rpm respectively and the mixing time was varied. Thus, the mixing time for sample 9 was 60 minutes; the mixing time for sample 10 was 50 minutes; the mixing time for sample 11 was 40 minutes; the mixing time for sample 12 was 30 minutes; and the mixing time for sample 13 was 20 minutes. The resulting pastes were also used to produce positive electrodes. The pastes for samples 9 to 13 were produced with the addition of the dispersing agent. The positive electrodes were then produced using these pastes and using the production method described above. Table 2 gives the following for the pastes used to produce samples 9 to 13, considered from the left: the results of measurement of the abundance ratio of aggregates having a particle size that is equal to or smaller than 20 µm and the solids fraction material content ratio (NV). The drying limit time in the drying step was also measured for samples 9 to 13, and the time saved in comparison to the drying limit time for the paste of sample 1 (450 s) is given in the "time savings" column in Table 2. FIG. 5 gives the relationship between the abundance ratio in the paste of the aggregates with a particle size that is equal to or smaller than 20 µm and the time savings in the drying step.

TABLE 2

| sample | abundance ratio (%) for not more than 20 μm | NV (mass %) | time savings (s) |
|---|---|---|---|
| 9 | 99.9 | 60 | 171 |
| 10 | 99.85 | 60 | 171 |
| 11 | 99.7 | 60 | 105 |
| 12 | 97 | 60 | 20 |
| 13 | 90 | 60 | 0 |

As may be understood from Table 2 and FIG. 5, the time savings in the drying step was shown to be significantly influenced by differences in the abundance ratio of aggregates having a particle size that is equal to or smaller than 20 μm—even when the solids fraction material content ratio in the paste was held constant at 60 mass %. That is, for a solids fraction material content ratio in the paste of 60 mass %, the effect of shortening the drying time is entirely absent when the abundance ratio of aggregates having a particle size that is equal to or smaller than 20 μm was around 90 mass %. However, a shortening of the drying time begins to be seen at an abundance ratio of around 97 mass %, and a sharp increase in this elect is seen at around 99 mass %. In addition, the effect of shortening the drying time is shown to be significantly influenced by just a 0.1% difference in the abundance ratio of aggregates having a particle size that is equal to or smaller than 20 μm. While the specific data are not shown here, when the results of the various changes in the solids fraction material content ratio in the paste at values of 60 mass % and above were taken into account, it was found that, when the solids fraction material content ratio in the paste was at least 60 mass %, a significant shortening of the drying time was obtained in all instances in which the abundance ratio of aggregates having a particle size that is equal to or smaller than 20 μm was brought to at least 99 mass %.

Based on the preceding results for samples 1 to 13, a paste for a sample 14 was produced by setting the solids fraction material blend in the paste to form a positive electrode active material layer so as to provide a mass ratio of positive electrode active material:electroconductive material:binder of 93:4:3 and by setting the solids fraction material content ratio in the paste to 60 mass %. The stirring conditions for this sample 14 were the same as for sample 9 above, and production was carried out using the dispersing agent. As a result, the abundance ratio of aggregates having a particle size that is equal to or smaller than 20 μm in the obtained paste was 99.9% and the viscosity of the paste was not more than 5,000 mP·s. A positive electrode was then produced using this paste and using the production method described above. As a result, the drying time in the high-rate drying described above was 72 seconds. That is, drying could be carried out in a 72-second traverse through a drying oven in which in only the first zone on the entrance side of the drying oven the drying temperature was 100° C. and only two fans on the lower side of the electrode were operated to blow air at a wind velocity of 5 m/s, and in which in the ensuing second zone and third zone, the drying temperature was 150° C., and three fans on the upper side of the electrode and two fans on the lower side were operated to blow air at a wind velocity of 5 m/s. The time savings was 378 seconds, which enabled a shortening of the drying time by a substantial 84% in comparison to sample 1. As may be understood from this result, this confirmed that the drying time in the drying step can be substantially shortened by using the production method of the embodiment to carry out the production of the paste to form a positive electrode active material layer. In particular, it is shown with sample 14 that the drying time can be shortened by 80% or more and that a substantial reduction in the production time is made possible by the electrode production method of the embodiment. This reduction in the production time can lead to an efficient use of the heat required for drying and to an improved productivity and can also realize cost reductions.

Laminate cell-type lithium batteries were assembled using sample 1 and sample 14 as the positive electrodes, and the performance of these batteries was evaluated. For properties such as the battery capacity, capacity retention rate, and so forth, it was found that the same performance was obtained for both the sample 1 positive electrode and the sample 14 positive electrode. Thus, using the production method of the embodiment, electrode production can be carried out while reducing the production time (drying time) and the energy required for production and this can be done without impairing the performance of the resulting battery. The invention has been described in the preceding using a suitable exemplary embodiment, but this description is not limiting and various modifications are of course possible.

Using the herein disclosed art, a method of producing an electricity storage device electrode can be provided in which the drying time (and thus the energy and amount of heat required for drying) can be substantially reduced, without requiring special drying facilities or equipment. Due to the high degree of dispersion of the aggregates in the paste to form an active material layer, this production method realizes high-rate drying without impairing the performance of the secondary battery electrode. Accordingly, through the use of the electrode produced by this production method, the invention can provide a method of producing electricity storage devices that can realize cost reductions through a reduction in the production time and the production energy.

What is claimed is:

1. A production method for an electrode for an electricity storage device, comprising:
   producing a paste to form an electrode active material layer, in which aggregates of a solids fraction material that contains at least an electrode active material and a binder are dispersed in a solvent;
   coating the paste on a surface of a current collector; and
   drying the current collector coated with the paste, to form the electrode active material layer formed of the solids fraction material,
   wherein the paste is produced in such a manner that a content ratio of the solids fraction material in the paste is 60 to 80 mass %, an abundance ratio for the aggregates with a particle size that is equal to or smaller than 20 μm is at least 99%, and a viscosity at 25° C. and a shear rate of 40 s$^{-1}$ is 200 to 5,000 mPa·s.

2. The production method according to claim 1, wherein the paste is produced in such a manner that the abundance ratio is at least 99% for the aggregates with a particle size that is equal to or smaller than twice an average particle size of the electrode active material by a laser diffraction scattering method.

3. The production method according to claim 1, wherein the coated current collector is dried by blowing air for 50 to 150 seconds at a wind velocity of 1 to 15 m/s in an atmosphere of 70 to 150° C.

4. The production method according to claim 1, wherein a time for drying the coated current collector is equal to or shorter than 120 seconds when a coating weight of the paste on the current collector is 25 to 50 mg/cm$^2$.

5. The production method according to claim 1, wherein an electroconductive material is further added as the solids fraction material.

6. The production method according to claim 5, wherein the electrode active material, the electroconductive material, and the binder are used as the solids fraction material and are blended so as to provide a mass ratio of electrode active material:electroconductive material:binder of 97 to 80:2 to 15:1 to 5.

7. The production method according to claim 6, wherein the solids fraction material is blended so as to provide a mass ratio of electrode active material:electroconductive material: binder of 95 to 86:3 to 10:2 to 4.

8. The production method according to claim 1, wherein the content ratio of the solids fraction material in the paste is 65 to 75 mass %.

9. The production method according to claim 8, wherein the content ratio of the solids fraction material in the paste is 68 to 72 mass %.

10. The production method according to claim 1, wherein a positive electrode for a lithium ion secondary battery is produced by using, as the electrode active material, a positive electrode active material that is a constituent of the positive electrode for the lithium ion secondary battery.

* * * * *